March 15, 1938.  W. W. McDOWELL ET AL  2,111,119
TABULATING MACHINE
Filed July 7, 1934  9 Sheets-Sheet 2

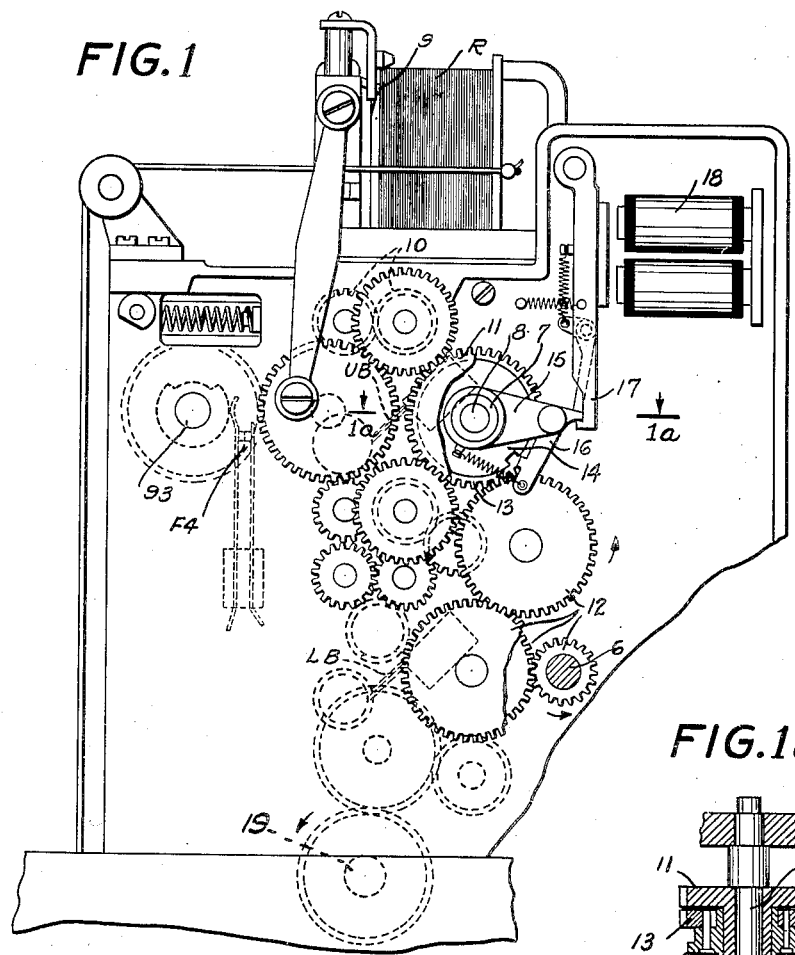

INVENTOR.
William W. McDowell
Gordon S. Wells
BY
ATTORNEYS.

March 15, 1938.　　W. W. McDOWELL ET AL　　2,111,119
TABULATING MACHINE
Filed July 7, 1934　　9 Sheets-Sheet 4

INVENTOR.
William W. McDowell
Gordon J. Wells
BY
W. M. Wilson
ATTORNEYS.

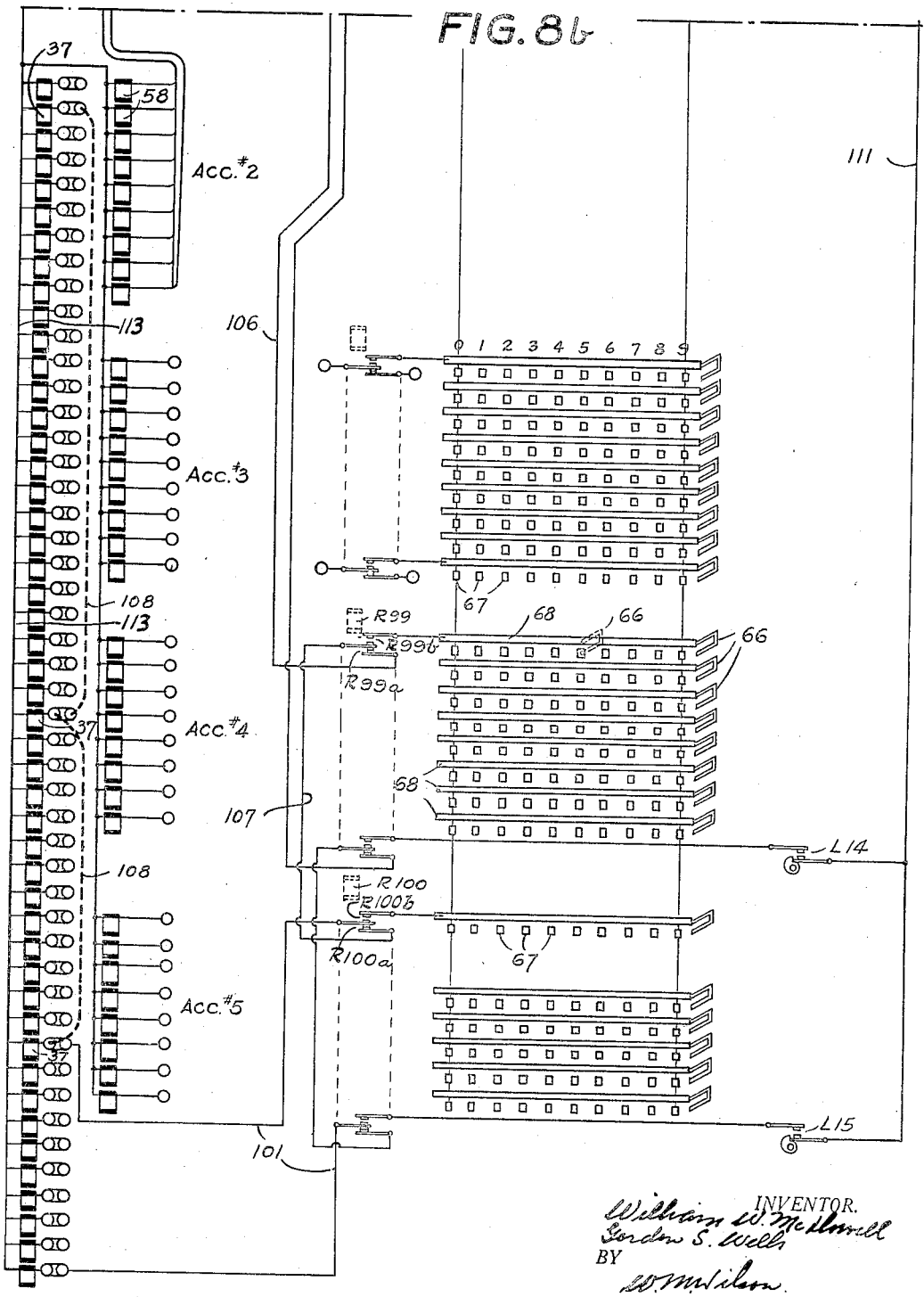

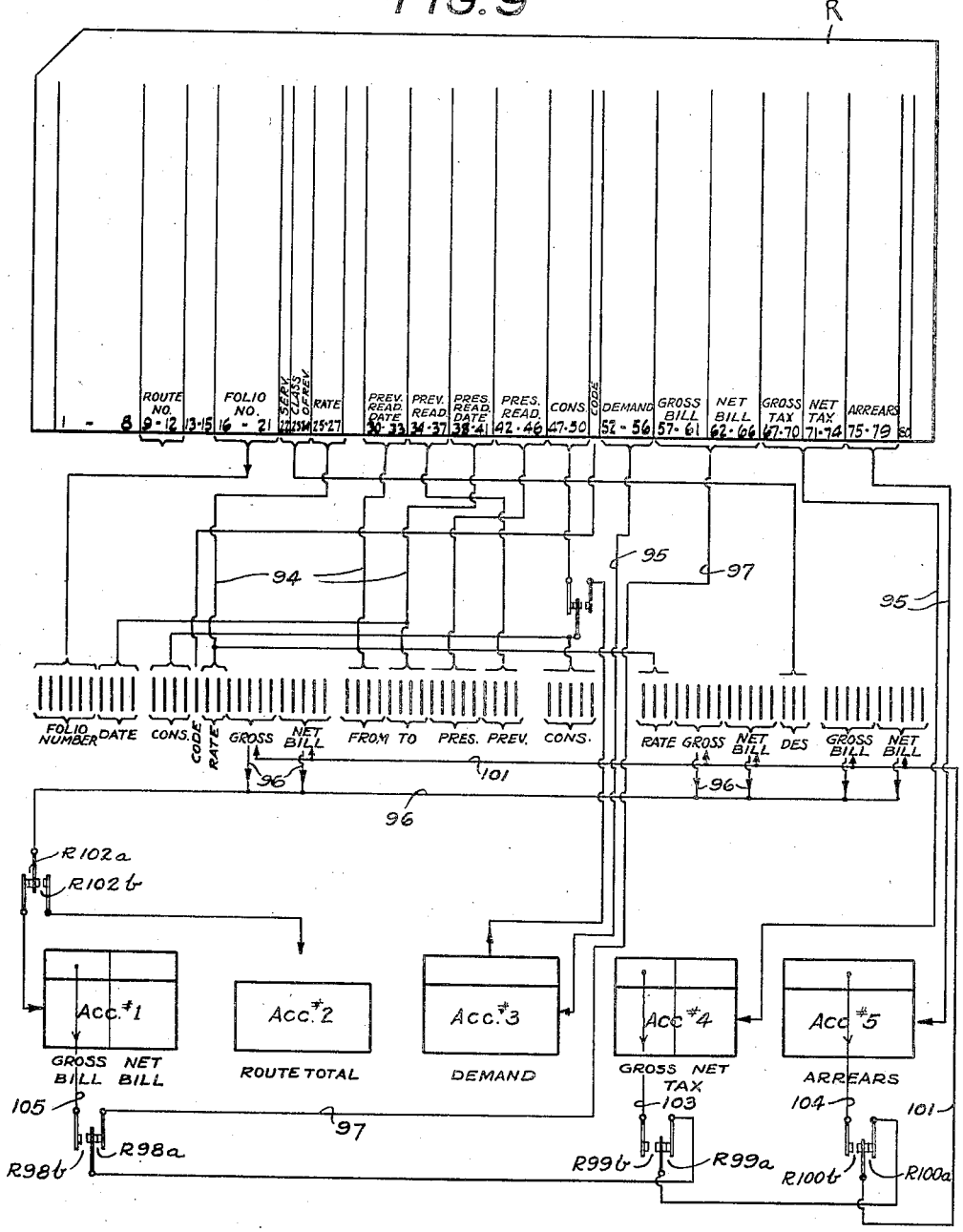

FIG.10

Patented Mar. 15, 1938

2,111,119

UNITED STATES PATENT OFFICE 2,111,119

TABULATING MACHINE

William W. McDowell and Gorden S. Wells, Binghamton, N. Y., assignors to International Business Machines Corporation, New York, N. Y., a corporation of New York Application July 7, 1934, Serial No. 734,124

12 Claims. (Cl. 235—61.9)

This invention relates to improvements in electric accounting machines and particularly to machines utilized in the preparation of statements or bills such as issued by public utility systems.

The principal object of the invention is to improve the interrelation between the various units of the machine to the end that the efficiency and reliability of the system may thereby be increased.

Statements as prepared for use in public utility systems are usually comprised of several separate portions such as the statement proper, the cashier's coupon, and a collection stub. Each of these sections receives common information, such as the separate values of the various items of service together with the total payable. These items are entered on the bill under control of perforated record cards which are analyzed electrically and the information in a particular field controls the duplicate printing in each of the several portions of the bill.

In order to insure that items which are to appear in all portions of the bill will be correctly printed, the machine is provided with checking mechanism associated with the type bars which will cause the machine to stop, if the setting of the bars is such that the same amount will not appear in each portion of the bill. The checking mechanism also serves to control the entry of the common information into an accumulator which accumulates the total amount of the bill. The checking mechanism functions while the machine is listing, to control the printing of common information as obtained directly from the analyzed record cards. With the provision of this checking mechanism, it is fairly assured that all items entered into an accumulator are in correspondence with the items printed and that the same items are printed in the different portions of the bill.

After the various individual items have been listed on the bill and each amount has been separately entered into the total accumulator, the machine enters into a total taking cycle of operations during which the amount standing in the total accumulator controls the setting of the type bars to print the total in each of the several sections. This setting is again checked for agreement in the several positions and, if agreement is found, the total will also be transferred to a further "grand" or "route" total. This transferred total will therefore only be entered into the "grand" totalizer, if and when the amount to be transferred is definitely and correctly set up on the several groups of type bars which are to print the same on the bill. Thus, each entry into either the "bill" total accumulator or "grand" total accumulator is definitely controlled by the setting of the type bars and the entries must necessarily correspond with the information printed.

In the event of any lack of agreement during any type bar setting operation, the machine will stop and a distinctive signal lamp will be illuminated to apprize the operator that some disagreement is present in the type bar settings which might be due to some mechanical or electrical reason.

After the printing of a total upon a bill, the "bill total" accumulator is cleared and the machine proceeds to prepare the next bill. After all the bills for a given route have been prepared, the machine automatically stops and a signal lamp is illuminated to call this to the operator's attention. At this time, the total in the "grand total" accumulator may be noted and a comparison made with a known total with which it should conform.

If these are in agreement, it is reasonably certain that all the bills for that particular route have been properly prepared in all details and that no errors are present in any of them.

For each bill to be prepared there is one or more cards depending upon the number of service items to be billed; for example, there may be a "gas" card, an "electric" card, and a "merchandise" card, arranged in the order stated. On either the "gas" or "electric" card may appear a tax charge or an arrears charge or both. If such tax or arrears amount is present on one of the cards, the machine automatically performs extra cycles of operation to cause the printing of the tax and the arrears amounts on separate lines of the bill before proceeding with the analysis of the next succeeding card.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is an outside view of the card feeding and analyzing mechanism, showing the card feed declutching devices.

Fig. 1a is a detail section on line 1a—1a of Fig. 1.

Fig. 2 is a detail view of the controlling devices of the accumulator resetting mechanism.

Figure 8:
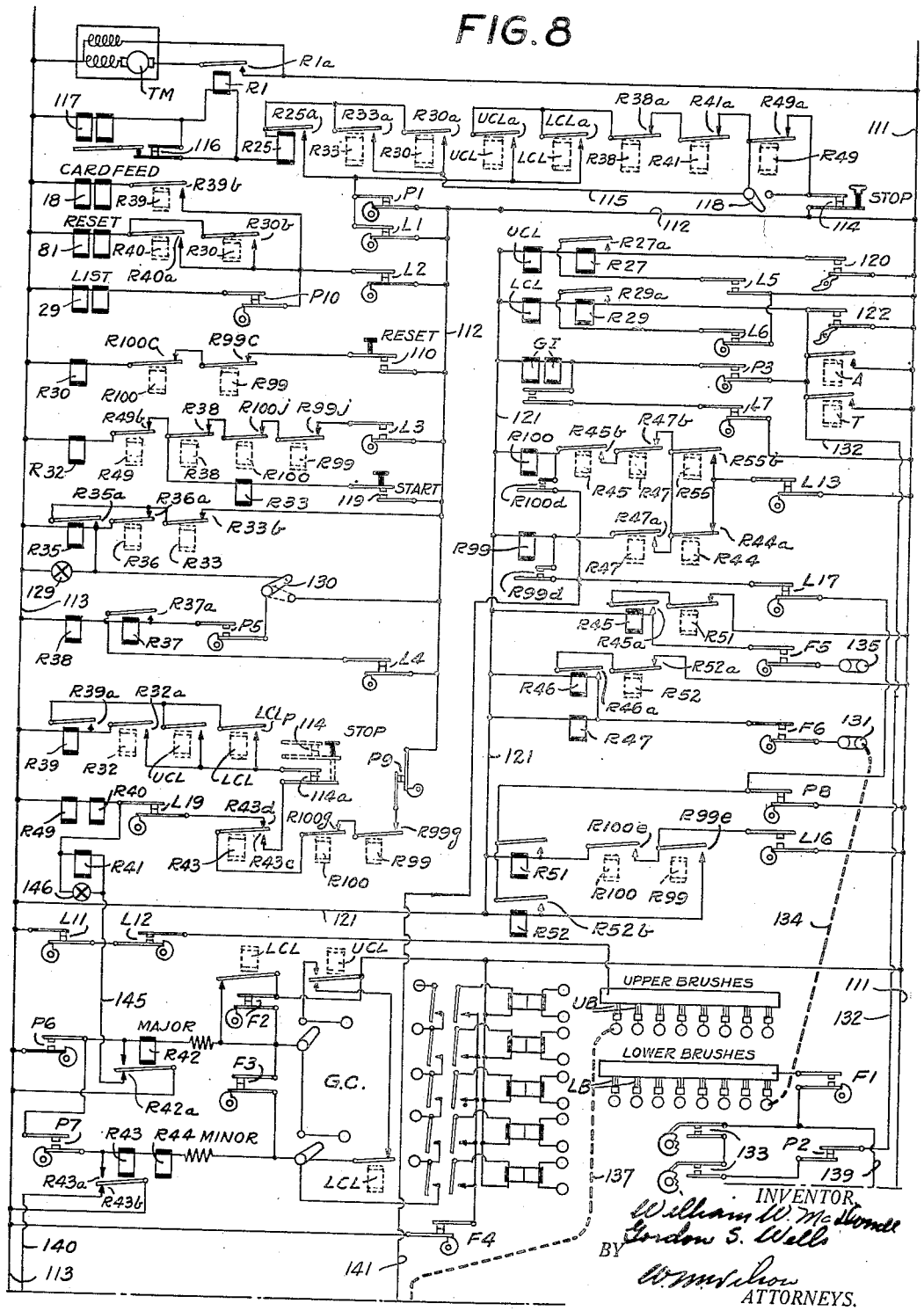
Figure 8A:
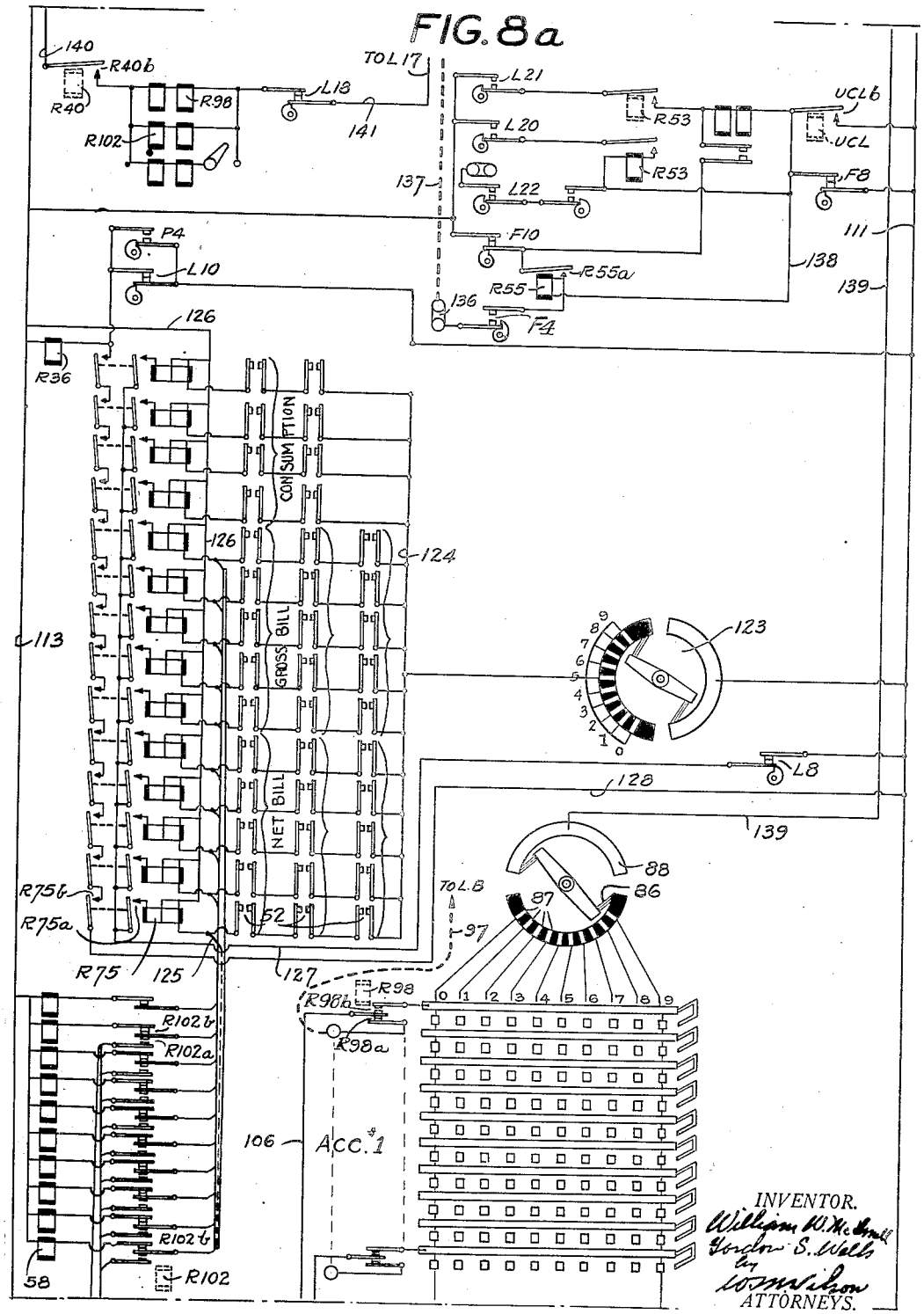

Figs. 8, 8a and 8b, placed one above the other in the order named, comprise the wiring diagram of the electric circuits of the machine.

Fig. 9 is a diagram showing the distribution of the data from a record card to the type bars and accumulators.

Figure 10:
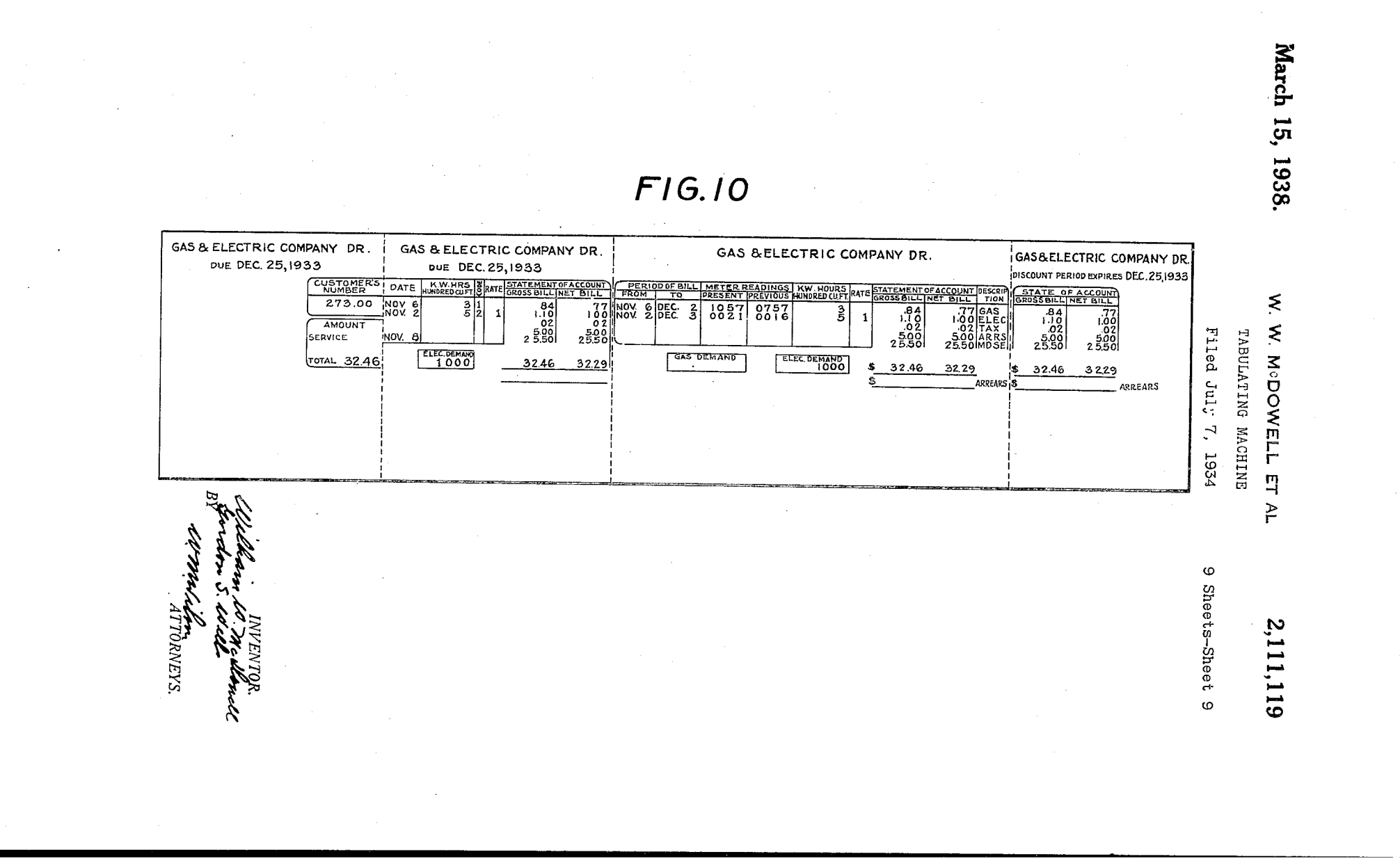

Fig. 10 is a specimen of a bill or statement as prepared by the machine.

The machine to which the features of the present invention are applied is similar to that shown in the copending application of C. D. Lake and G. F. Daly, Serial No. 672,388, filed May 23, 1933, now Patent No. 1,976,617. This copending application illustrates and explains in more extensive detail the manner of organization and mode of operation of the various units of a well known type of tabulating machine. In the present application, these mechanisms will be explained in only as much detail as will be necessary to point out the manner in which the objects of the present invention may be realized.

Before setting forth the general operation of the machine, the various mechanical units will be described and their relationship pointed out thereafter.

Card feeding mechanism

The card feeding mechanism shown in Fig. 1 is exactly similar to that shown and described in the application referred to except that provision is made in the form of a clutching device for interrupting the card feeding operations without stopping the accumulating drive mechanism. The analyzing brushes are indicated at UB and LB and the record cards R are successively advanced by picker 9 to pairs of feed rollers 10 which serve to advance the cards past the upper and lower brushes UB and LB in succession. The shafts upon which rollers 10 are mounted are provided with gears at their extremities, arranged as shown in Fig. 1 for operation by a main driving gear 11 which is freely mounted upon a shaft 8 and which has connection with an arm 15 through a sleeve 7. Arm 15 carries spring-pressed clutching dog 16 normally held in the position shown by an armature latch 17 which is adapted to be controlled by the clutch magnet 18. Between gear 11 and arm 15 are a gear 13 and a clutch driving disk 14 freely rotatable upon the sleeve 7. Gear 13 has gear connection generally designated 12 with the pulley shaft 6 which is in operation as long as the main driving motor is operative. Energization of magnet 18 will trip dog 16 into engagement with disk 14 and the card feeding mechanism will cause cards to be advanced past the brushes UB and LB and feeding operations will continue as long as magnet 18 remains energized.

During transferring and total taking cycles of operation, magnet 18 is deenergized and card feeding will, of course, not take place during such cycles.

Printing mechanism

Figure 3:
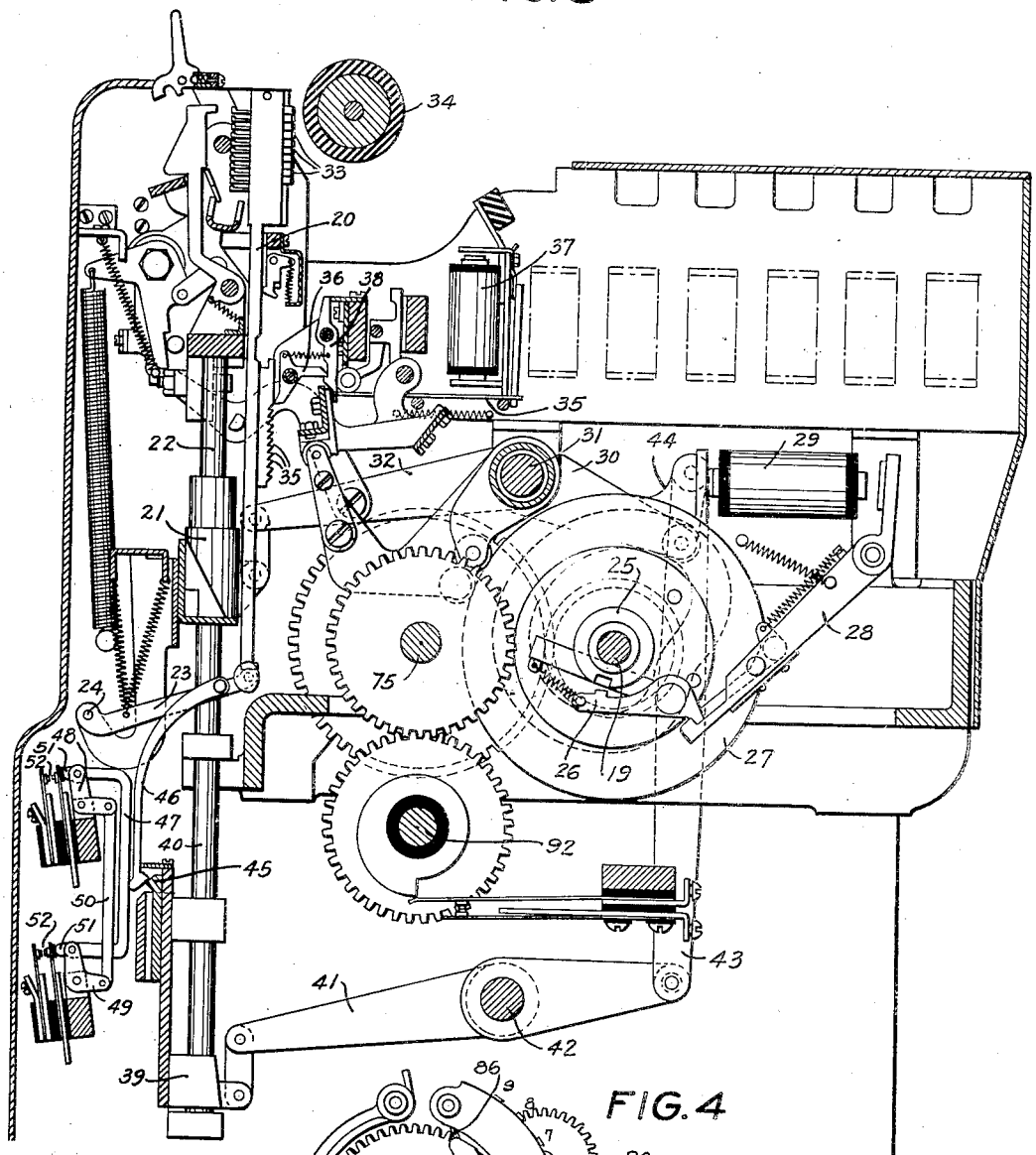
Fig. 3 is a central section of the printing mechanism.

The printing mechanism is shown in Fig. 3 where type bars 20 are carried by crosshead 21 which is slidable vertically on rods 22. Spring-pressed arms 23 pivoted to the crosshead at 24 have their free ends abutting the lower extremity of the type bars so that as the crosshead moves upwardly, the type bars are urged in the same direction. The reciprocating movement of the crosshead is controlled from shaft 19, which as shown in Fig. 1 is continually driven from the main operating shaft 6. Shaft 19 has secured thereto clutch driving element 25 notched to cooperate with a clutching dog 26 carried by and pivoted to listing cam 27. Clutch releasing arm 28 cooperates with dog 26 to hold the parts in the position shown when magnet 29 is deenergized. Energization of magnet 29 will rock arm 28 in a counterclockwise direction releasing dog 26 for engagement with element 25 whereupon the listing cam will rotate with shaft 19 and through follower arm 30 will oscillate shaft 31.

Secured to shaft 31 are arms 32 whose free ends have link connection to the crosshead 21 which will thereby be reciprocated once for each revolution of the listing cam. As the type bars move upwardly, the type elements 33 will successively pass its printing position opposite platen 34 and ratchet teeth 35 will successively pass the toe of stop pawl 36. Energization of printing magnet 37 will trip latch 38, permitting stop pawl 36 to engage one of the ratchet teeth 35 thus positioning the corresponding type element opposite the platen.

An auxiliary crosshead 39 is provided which is slidable upon rods 40. The crosshead 39 is link connected with a lever 41 pivoted at 42 and having its shorter arm connected by a link 43 to an arm 44 secured upon shaft 31. With this arrangement the cross head 39 moves upwardly in unison with the crosshead 21. Carried by crosshead 39 are adjustable camming elements 45, one for each type bar. Each element is adapted to cooperate with an interposer 46 pivoted to and depending from arm 23. The operation of the mechanism is such that as the crossheads move upwardly the parts maintain the same relative positions they occupy in Fig. 3. Upon the energization of magnet 37, however, and the consequent interruption of further upward movement of type bar 20, the lower extremity of the bar will become a fulcrum for the free end of arm 23. The pivot point 24 of arm 23 will, of course, continue its upward movement with the crosshead 21 so that the interposer 46 will now move upwardly at a greatly reduced rate.

The camming element 45 moving upwardly with crosshead 39 will force the free end of interposer 46 toward the left momentarily as the camming portion of element 45 passes the camming surface of the interposer. In alignment with interposer 46 is a link 47 carried by a pair of bell cranks 48 and 49 which are connected for parallel movement by a link 50. Movement of interposer 46 toward the left will cause a corresponding movement of associated link 47 and the extending nose 51 thereof will cause closure of a pair of contacts 52. For convenience in construction, alternate links 47 have the extensions 51 at opposite extremities and the related contacts 52 are similarly staggered.

There is but a single pair of contacts 52 associated with each of the type bars. In Fig. 3 there are two contacts 52, one of which is associated with the type bar shown and the other is associated with the next adjacent type bar. As the contact blades are wider than the spacing between adjacent type bars, it has been inconvenient to place the contacts side by side and they have accordingly been staggered. The contacts associated with the even number type bars are placed at the upper level and their operating links 47 have only the upper nose 51. The contacts associated with the odd number type bars are placed at the lower level and their operating links 47 have only the lower nose 51.

Briefly then, the energization of the printing magnet 37 will interrupt the type bar 20 with a printing element in position. Immediately following the interruption of the type bar movement, the resultant relative movement between interposer 46 and camming element 45 will cause momentary closure of the associated pair of contacts 52. These contacts are utilized to control the entry into the accumulator of the value set up on the type bar in the manner to be presently explained.

Accumulating mechanism

Figure 6:
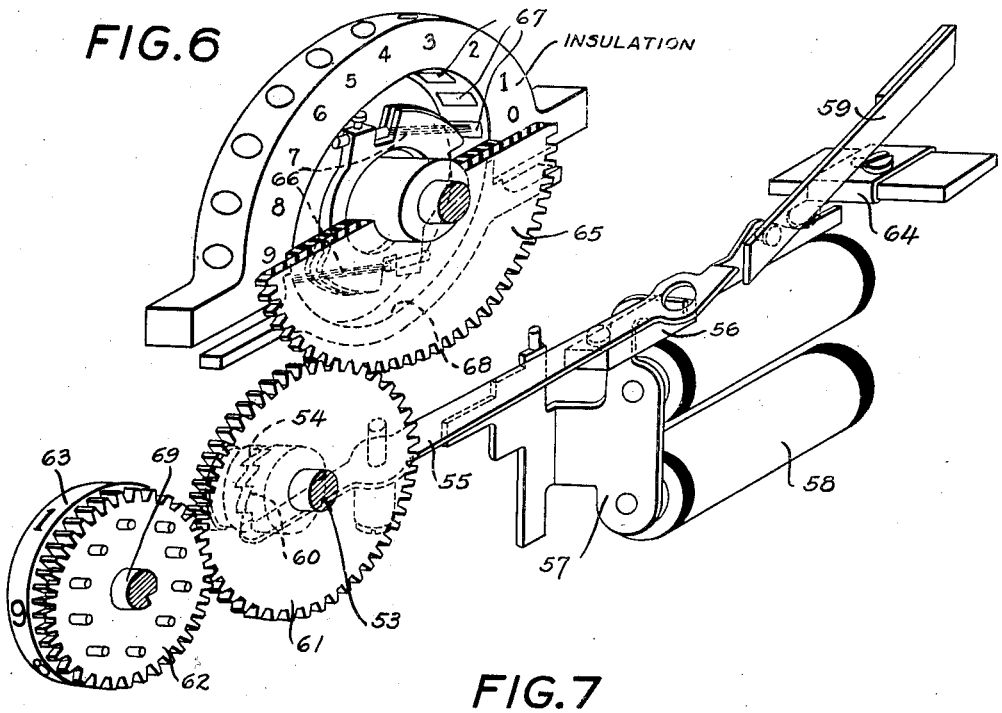
Fig. 6 is an isometric view of one denominational order of an accumulator.

The adding mechanism is entirely similar to that shown and described in the application referred to and the description thereof will accordingly be limited to a brief explanation of its manner of operation. The accumulator drive shaft 53 (Fig. 6) is geared directly to the pulley shaft 6 of Fig. 1 so that it is in operation as long as the driving motor of the machine functions and the driving ratio is such that shaft 53 makes one revolution for each card feeding cycle of the machine. Shaft 53 has slidably mounted thereon but keyed for rotation therewith a clutch element 54, one for each denominational order of the accumulator. The element 54 is provided with a groove in which fits the short arm of a lever 55 which is pivoted as shown and provided with a block 56 normally held as in Fig. 6 by armature latch 57 of adding magnet 58. A leaf spring 59 bears against the extremity of the longer arm of lever 55 and moves the same in a counterclockwise direction upon release of block 56 by armature 57. This movement will bring clutching member 54 into engagement with cooperating teeth 60 integral with a gear 61 loosely mounted on shaft 53. Gear 61, when thus coupled to shaft 53, will rotate a gear 62 which meshes therewith and will displace the accumulator index wheel 63.

The rearward extremity of member 55 is adapted to be engaged by a finger 64 toward the end of the cycle for the purpose of disengaging the clutch element 54 from teeth 60 and re-latching block 56 on armature 57.

Briefly summarizing the adding operation, the magnet 58 may be energized at various points in the cycle of the machine, depending upon the location of a perforation in the column of a record card analyzed by the lower brushes LB. This energization may take place in response to a perforation in any of the index point positions from 9 to 1, inclusive. A perforation in the "9" index point position will trip the clutch element 54 nine steps before finger 64 is operated to declutch it and a perforation in the "1" index point position will trip the clutch element 54 one step before it is declutched by the finger 64. Each step of clutching engagement corresponds to a tenth of a revolution in the accumulator index wheel 63 so that a "9" hole will move it 9/10 of a revolution and the "1" hole will move it 1/10 of a revolution.

The energization of magnet 58 is controlled by the closure of the contacts 52 associated with the printing mechanism. The manner in which the circuits are completed will be set forth in connection with the explanation of the circuit diagram.

Read-out mechanism

Also driven by gear 61 (Fig. 6) is a gear 65. Since the ratio of gears 65 and 62 is 2:1, the former will turn through a half revolution for each revolution of the latter. Carried by and insulated from gear 65 is a pair of electrically connected brushes 66, one of which cooperates successively with ten conducting segments 67 while the other cooperates with an arcuate conducting strip 68.

The relationship of the parts is such that when the index wheel 63 is in its zero position, one of the brushes 66 is in contact with the zero segment 67 and the other brush is in contact with the strip 68, thus forming an electrical connection between the two. If the wheel 63 is displaced to indicate, say "8", then one of the brushes 66 will be in contact with the "8" segment 67 and the other brush will be in contact with the arcuate strip 68.

The positioning of the brushes 66 provides a convenient electrical read-out mechanism for controlling total transferring and total printing operations and the electrical circuits involved in these functions will be more fully explained in connection with the circuit diagram.

Accumulator resetting mechanism

The shaft 69 (Fig. 6), upon which the index wheels 63 of an accumulator are loosely mounted is slotted for cooperation with spring-pressed pawls (not shown) pivoted upon and carried by the individual index wheels in such manner that counterclockwise rotation of shaft 69 will engage and drive the index wheels 63 forwardly to zero position during a single revolution of shaft 69.

Figure 5:
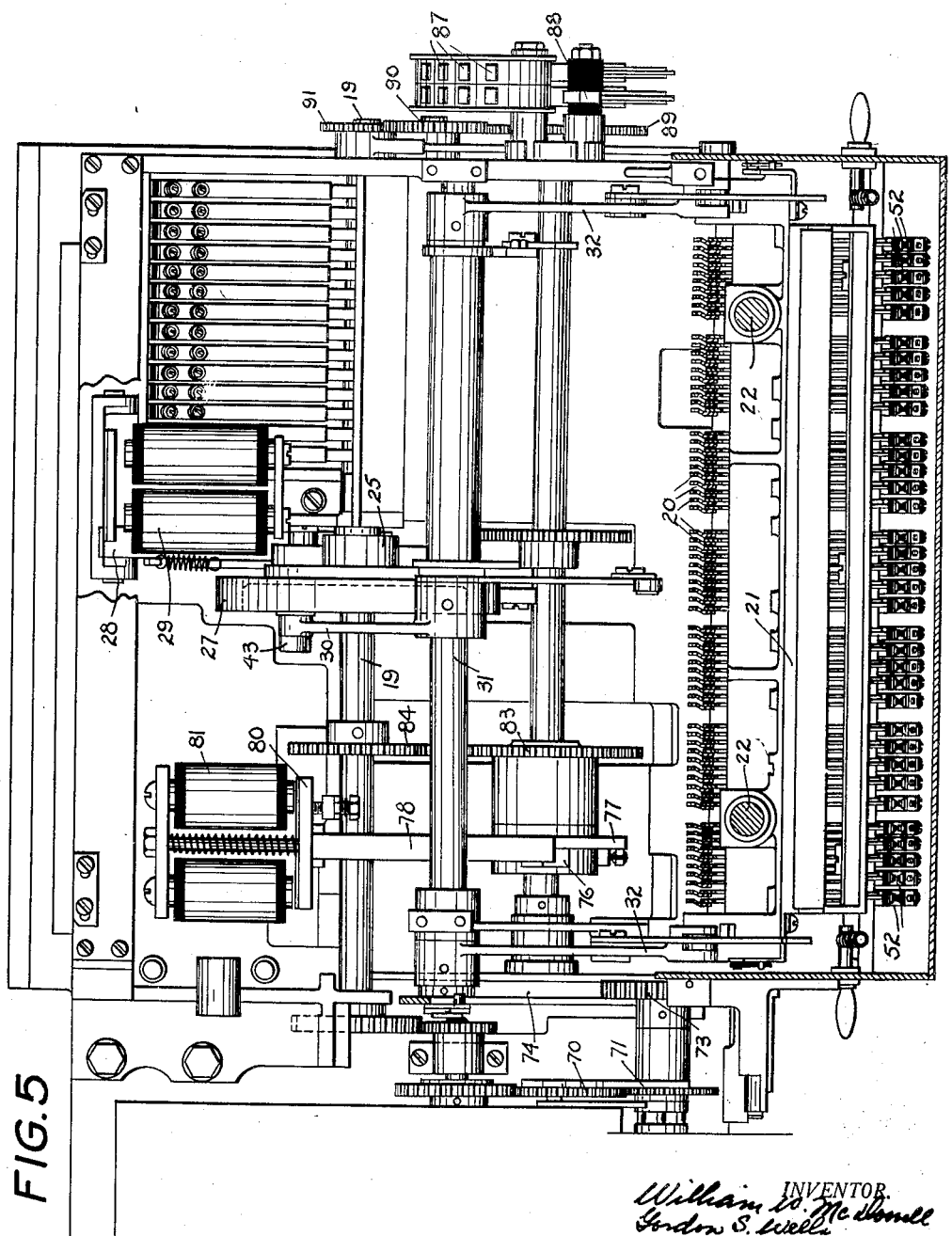
Fig. 5 is a plan sectional view showing the main driving and operating mechanism of the printing section of the machine.

Referring to Fig. 2, shaft 69 carries a gear 70 at its extremity which is in engagement with gear 71 mounted upon reset shaft 72. Gear 71, of which there is one for each accumulator, may be selectively coupled to the resetting shaft 72 in the well known manner more fully explained in the application above referred to. At the extremity of shaft 72 is a gear 73 (see also Fig. 5) which is adapted to be driven by an intermediate gear 74 which is secured to shaft 75. Also fixed to shaft 75 is an arm 76 which carries spring-pressed clutch dog 77 normally held in the position shown in Fig. 2 by a latching arm 78 supported by armature shaft 79 of magnet armature 80.

Energization of magnet 81 will release dog 77 for engagement with clutch driving element 82. Element 82 is integral with a gear 83 which meshes with a gear 84 secured upon constantly running shaft 19. With this arrangement, drive element 82 is in constant rotation and whenever it is desired to effect resetting of the accumulators, magnet 81 is energized to provide a connection between the element 82 and the resetting shaft 72. Resetting is usually an accompaniment of total taking and by virtue of the intermittent gear connection occurs during the latter part of a total taking cycle.

Circuit controlling devices

Figure 4:
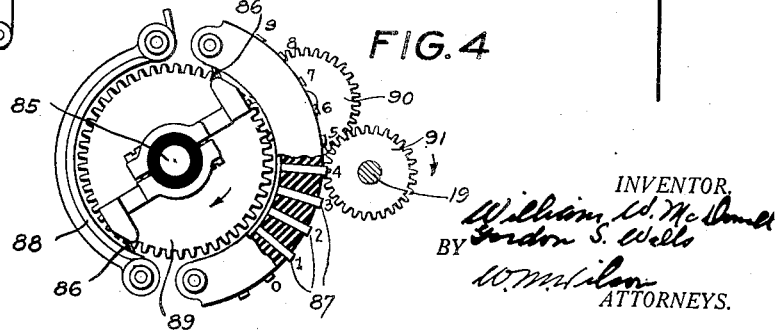
Fig. 4 is a detail of an impulse emitting commutator.

In Fig. 4 is shown a so-called emitter which cooperates with the read-out devices of the accumulator for total printing or total transferring operations. Carried by a stud 85 coaxially with the shaft 75 is a pair of electrically connected brushes 86, one of which contacts with conducting segments 87 while the other wipes over a common arcuate conducting strip 88. The brushes 86 are carried by a gear 89 driven through an idler 90 from a gear 91 carried by constantly running shaft 19. The emitter used for controlling total printing operations is timed so that a brush 86 successively contacts with each of the segments 87 as the corresponding type elements 33 of Fig. 3 approach printing position opposite platen 34. The emitter used for controlling total transferring operations is timed so that one of its brushes 75 successively contacts with each of the segments 87 at times appropriate to the entry of corresponding digits into the accumulators.

In Fig. 3 are shown a plurality of cam controlled contacts whose operation is controlled by cams carried by a shaft 92 driven from shaft 75. The contacts are prefixed "P" to indicate that they function only during total taking and resetting operations. Similar cam controlled contact devices prefixed with the letter "L" are carried by or may be driven from the shaft 19 and these are in constant operation as long as the driving motor functions.

In Fig. 1 is shown a shaft 93 which is driven from the gears of the card feeding mechanism and rotates only when cards are being advanced. Controlled by suitable cams on shaft 93 are contact devices, each of which is designated by the letter "F" indicating that they are associated with the feeding mechanism and operative only when the feeding mechanism functions.

All these cam contact devices are indicated in the timing diagram (Fig. 7) where their relative timing may be observed.

*General explanation of the circuit diagram*

Figure 7:
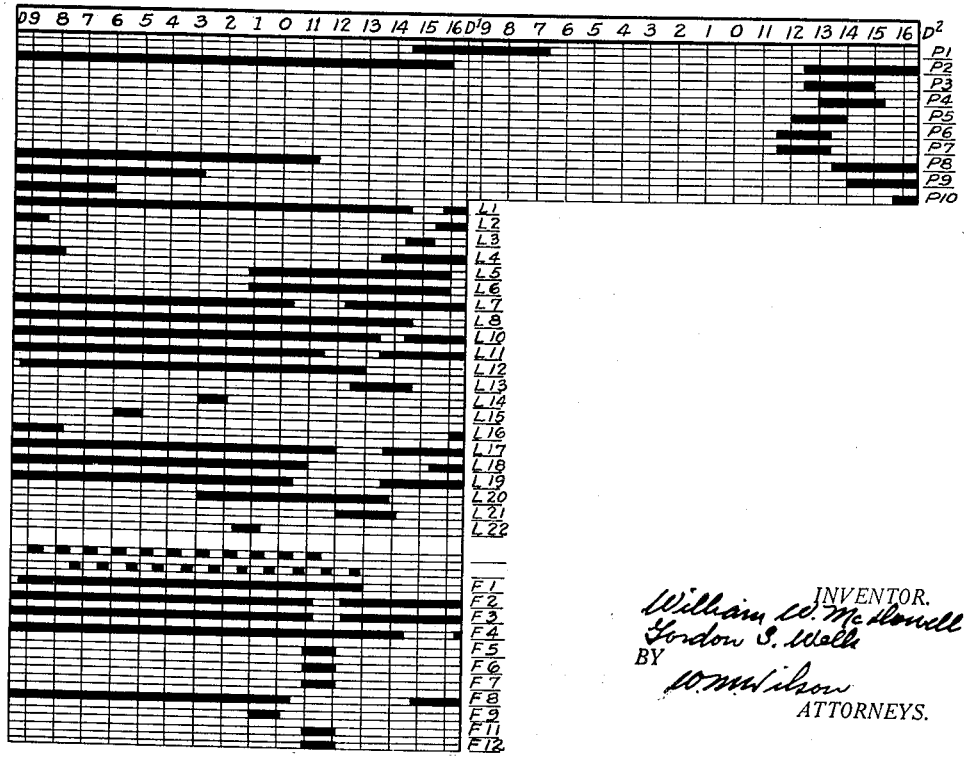
Fig. 7 is a timing diagram of the circuit closing devices of the machine.

The wiring diagram of the electric circuits is shown in Figs. 8, 8a and 8b wherein the various cam controlled contact devices are diagrammatically shown and suitably labelled F, L or P for identification as just explained. The exact timing of these contact devices is shown in Fig. 7 to which reference may be made for the actual time in the cycle of operation during which they function. Due to the numerous interlocking relays employed in the present arrangement, it has not been advisable in all instances to show relay magnets and their associated contacts in close proximity to one another.

For purposes of clarity in the wiring arrangement, the relay contact points are shown in the circuits which they control and their relay magnets are repeated adjacent thereto. Further than this, the contacts are designated with the same reference numeral as their controlling magnet, followed by a lower case letter.

*General operation.*—The general operation of the machine will first be outlined with particular reference to Figs. 9 and 10. The record card R is provided with data fields labelled as shown, which are to control the printing by type bars 20 and certain of which will control the entry of data into the accumulators 1–5 indicated below the row of type bars.

All of the card fields from which printing is to be controlled are connected directly to the appropriately located type bars 20 as by connections indicated 94. This is with the exception of fields labelled "Demand," "Gross Tax," "Net Tax" and "Arrears." These fields are connected directly to the accumulators #3, #4 and #5 as by connections 95. Some of the connections 94 from the direct listing fields are branched to effect the same entry into more than one section of the type bars; for example, the consumption field enters its data in two places. In such case, these positions of the type bars are provided with the checking contacts 52 to insure that printing will actually be the same in the related positions.

The "gross bill" and "net bill" fields are connected for entry into three sections of the type bars through a connection indicated at 97 as follows: from the card fields through connection 97, relay contacts R98a, R99a, and R100a in series, connection 101, to the appropriate type bars 20, as indicated by vertical lines extending upwardly from connection 101. If the data is correctly printed in the several positions on the bill, the same information is entered in ACC#1 through connections 96 which, under control of the type bar contacts 52, transfer the data through connection 96, relay contacts R102a, to ACC#1. The timing of ACC#1 is adjusted to take account of the time delay between the analysis of the card field and the eventual entry into the accumulator.

If a record card contains "tax" or "arrears" perforations, a cycle of operations follows an initial entering cycle, during which following cycle the data standing in ACC#4 is printed and transferred to ACC#1, and during a succeeding cycle the data in ACC#5 is similarly printed and transferred. During the "tax" transfer cycle the contacts R99a are open and contacts R99b are closed and the data is read from the upper or read-out section of ACC#4 through connection 103, contacts R99b, contacts R100a, connection 101, to the "gross and net bill" sections of the type bars and from there, if the duplicate printing is correct, through the checking contacts 52 and connections 96 to ACC#1. During the "arrears" transfer cycle, contacts R100a are open and R100b closed so that the transfer is similarly effected from the read-out section of ACC#5 through connection 104, contacts R100b, connection 101, to the type bars, and from thence to ACC#1.

After all the record cards for a particular account or folio number have been analyzed, the machine will enter into a total taking cycle of operations during which contacts R98a and R102a are open so that the total in ACC#1 may be transferred from the read-out section thereof through connection 105, contacts R98b, now closed, contacts R99a, R100a, connection 101, to the several sections of the type bars and, again, if the printing is the same in all positions, through connections 96, contacts R102b, to ACC#2. At the completion of this total taking cycle, ACC#1 is cleared but the data is retained in ACC#2 which will receive all totals and at the completion of all tabulating operations will show what is termed the "route" total which may be compared with a known value. After all the record cards for a particular "route" have been analyzed the machine will stop.

*Initial reset cycle.*—In the lower part of Fig. 8 is shown the usual group control mechanism, generally designated GC, and as is usual in tabulating machines, it is first necessary to set up the major and minor holding relays R42 and R43 before the machine can be started. This is effected by depression of the reset key to close contacts 110, thereby completing a circuit from right side of line 111, wire 112, contacts 110, relay contacts R99c, R100c, relay coil R30, to left side of line 113. Energization of magnet R30 will close its contacts R30a in the upper part of Fig. 8 which will thereupon complete a circuit from right side of line 111, stop key contacts 114, contacts R49a, wire 115, contacts R30a, relay magnet R25, contacts 116, main drive clutch magnets 117, to line 113. Energization of magnets 117 will cause coupling of the driving motor to the pulley shaft 6, mentioned above, and will, incidentally, cause opening of contacts 116 whereupon relay R1 will be included in the series circuit through magnet 117 and will close its contacts R1a to complete the circuit through motor TM.

Contacts R25a provide a holding circuit which is traceable from the contacts through cam contacts L1 and wire 112 to line 111. Cam contacts L1 open toward the end of each cycle, and at such time, the circuit through magnet R25 is maintained through either contacts UCLa or contacts LCLa which are in series with contacts R38a, R41a, R49a, and stop key contacts 114.

The manner in which one or more of these contacts in the holding circuit may be opened to interrupt the same will be explained hereinafter. When the machine is set for automatic resetting, following total taking operations, switch 118 is closed to short-circuit contacts R49a.

The relay magnet R30, energized by depression of the reset key will close a second pair of contact points R30b for completing a circuit from line 111, wire 112, cam contacts L2, contacts R30b, reset magnet 81, to line 113.

As explained in the mechanical description, energization of magnet 81 will effect resetting of the accumulators and will cause a cycle of operation of the P cam contacts of which contacts P7 (the lower part of Fig. 8) close to set up the minor control circuit and contacts P6 operate to set up the major control circuit. The detailed manner in which the group control mechanism GC functions to control the operation of the machine is well known in the art and fully set forth in the Patent No. 1,976,617 above referred to so that such detailed description will be unnecessary here. Suffice it to say that upon a change in the minor group classification perforations which in the present case relate to "folio number", relay magnets R43, R44 will become deenergized and a change in the major group classification perforations which in the present case relate to the "route number", will cause deenergization of relay magnet R42 along with R43 and R44.

*Starting circuit.*—With the group control set up, that is, with magnets R42, R43, and R44 energized, and the accumulators cleared, the machine is in readiness to feed cards and analyze the data thereon. Depression of start key and closure of contacts 119 will complete a circuit from line 111, wire 112, contacts 119, relay magnet R33, contacts R49b, relay magnet R32, to line 113. The contact points R33a are in parallel with the contacts R30a and will complete the following circuit through the driving clutch magnet and cause operation of the motor TM. From line 113, magnet 117, relay R1, magnet R25, contacts R33a, wire 115, contacts R49a and 114 to line 111.

Relay magnet R32 is provided with a pair of contacts R32a which are adapted on closure to complete a circuit to the card feed clutch control relay magnet R39. This circuit is traceable from line 113, magnet R39, contacts R32a, stop key contacts 114a (operable concurrently with the contacts 114), contacts R43c of the minor control relay magnet R43 which are now closed, contacts R100g, R99g, contacts P9, wire 112, to line 111. This circuit, it will be observed, can only be completed when the group control relay magnet 43 is energized. Magnet R39 will close its points R39a to provide a holding circuit for the magnet and a second pair of points R39b wired in series with the card feed clutch magnet 18 will energize the latter so that cards may commence to feed. The holding circuit for magnet R39 is traceable from line 113, magnet R39, contacts R39a, contacts LCLp, 114a, R43c, R100g, R99g, P9, wire 112 to line 111.

*Card lever circuits.*—As the cards are advanced past the upper set of analyzing brushes UB, the usual card lever contacts 120 are closed to complete a circuit from line 111, contacts 120, relay magnet R27, magnet UCL, wire 121, to line 113.

Magnet UCL controls a number of contacts which are disposed in various circuits for controlling purposes. One of these contacts, for example UCLa pointed out above as being in the holding circuit of the motor drive clutch, will open to interrupt this circuit, if cards fail to feed past the upper brushes. Since the card lever contacts 120 open between the successive cards, a holding circuit is provided through contacts R27a and cam contacts L5 which serve to maintain magnet UCL energized during the interval when contacts 120 are open. In a similar manner, the lower card lever contacts 122 cause energization of relay magnet R29 and lower card lever relay LCL and the contact points R29a cooperate with cam contacts L6 to provide a similar holding circuit.

*Listing circuits.*—The circuit for the listing magnet 29 is completed from line 111, wire 112, contacts L2, P10, list cam clutch magnet 29, to line 113. Through this circuit, magnet 29 is energized each cycle of operation of the machine and the printing mechanism will function accordingly.

As the record cards advance past the lower brushes LB the entries made in the fields containing descriptive data are directly entered on the type bars as explained in connection with Fig. 9 and any data contained in the "demand", "tax" or "arrears" fields entered into ACC#3, ACC#4, and ACC#5, respectively. Entries in the "bill" fields will be printed on the bill directly and upon closure of contacts 52 will be thereupon entered into ACC#1. These entering circuits are shown in Figs. 8a and 8b and a representative circuit illustrating the manner of entering from the bill field of the card will be traced thereon.

Connection 95 in the lower part of Fig. 8a is connected to a lower brush and will receive current through a perforation in the bill field from right side of line 111, thence through contacts 98a, connection 106 (Fig. 8b), contacts 99a, connection 107, contacts 100a, connection 101, to printing magnet 37 and through plug connections 108 to similar printing magnets 37 in the appropriate positions for duplicate printing of the amount sensed. With the circuit just traced, the amount perforated in the selected card column will be printed in three places on the bill and as each type bar is interrupted, the associated pairs of contacts 52 will be closed at the same time if the bars are correctly positioned. The contacts 52 are shown in Fig. 8a and arranged in groups as shown. Assuming the three lowermost contacts to be associated with the three type bars positioned as just explained, their concurrent closure will complete a circuit from right side of line 111, through the emitter, generally designated 123, wire 124, the three lowermost contacts 52, wire 125, enclosed in the cable as shown, contacts R102b, accumulator magnet 58 of ACC#1, to left side of line 113. As explained in the mechanical description, the contacts 52 close momentarily at the time the upward movement of the type bar is intercepted and unless the three associated type bars are intercepted at the same time, the last traced circuit will not be completed and no entry will be made in the accumulator.

*Error indicating circuits.*—The circuit traced through contacts 52 in series has a parallel branch circuit extending from the contacts through the right hand coil of a double wound relay magnet R75 and through wire 126 to line 113 so that the relay becomes energized whenever there is correct duplication of the printing.

Energization of the relay will close associated pairs of contacts R75a and R75b, the former providing a holding circuit for the relay which extends from line 113, through wire 126, left hand winding of relay R75, contacts R75a, wire 127, cam contacts L8, to right side of line 111. This circuit is maintained until contacts L8 open near the end of the cycle. Contacts R75b are wired in series with similar contacts associated with other groups of type bar positions so that if correct printing takes place in all positions, all of the contacts R75b will be closed and a circuit will be completed therethrough extending from line 111, through wire 128, contacts R75b, relay magnet R36, to line 113.

Relay magnet R36 is normally held energized through a circuit extending from line 113, magnet R36, cam contacts L10 to right side of line. Near the end of each card feeding and analyzing cycle, cam contacts L10 open momentarily and if there has been agreement in all printing positions, the circuit through the relay will be maintained through the series contacts R75b as traced. If one of the contacts R75b fails to close, the relay circuit will be deenergized.

Referring now to Fig. 8 the deenergization of relay magnet R36 will permit closure of its contacts R36a thereby establishing a circuit from right side of line 111, through wire 112, contacts R33b, contacts R36a, relay magnet R35 to line 113. A parallel circuit will also flow from contacts R36a through a lamp 129. Magnet R35 will close its contacts R35a to provide a holding circuit to maintain the lamp illuminated. The contacts R35a also provide for causing the machine to stop after the next succeeding total taking operation of the machine. This is brought about as follows:

During the total taking cycle when cam contacts P5 close near the end of the cycle, a circuit is established from line 113, through relay magnets R38, R37, contacts P5, switch 130, contacts R35a, contacts 33b, wire 112, to line 111. Magnet R37 closes its contacts R37a to provide a holding circuit for the relays through cam contacts L4. Relay magnet R38 opens its contacts 38a which are in the main clutch magnet circuit at the upper part of Fig. 8, so that the machine will stop at the end of the cycle.

It will be apparent from the foregoing that the lamp 129 will be illuminated at the time an error in printing is detected but the machine will nevertheless complete the preparation of the bill and will then come to a stop with the lamp 129 indicating the reason for stopping. As will be pointed out hereinafter, the machine may automatically stop at this time for other reasons and the lamp 129 serves to identify the stopping action as being due to the non-conformity of the duplicate printing.

Thus far we have seen how the data perforated in the three fields of the card, namely, the "bill" field, the "tax" and the "arrears" fields, are entered into ACC#1, ACC#4 and ACC#5, respectively and the amount of the bill printed. This cycle of operations takes place for each of the cards of the group having the same folio number.

*Tax transfer cycle setup.*—Referring now to Fig. 8, a plug socket 131 is provided from which a plug connection is made to the lower brush LB associated with column 22 of the record card R. Record cards containing a perforation in the "X" index point position of this column are thereby identified as containing "tax" data which is to be cross added with the other amounts on the bill.

The analysis of this "X" perforation as it passes the lower brushes will complete circuits to prepare the machine for a transferring operation at the end of the analysis of the group of cards relating to the particular account which have "tax" or "arrears" items thereon. The initial circuit extends from the right side of line 111, lower card lever contacts 122, wire 132, cam contacts P2, circuit breakers 133, cam contacts F1, lower brush common, X22 perforation, plug connection such as 134, socket 131, contacts F6, relay magnets R46 and R47 in parallel, wire 121, to line 113. This circuit is held through contacts R46a extending from line 111, through relay contacts R52a, contacts R46a, relay magnets R46 and R47, wire 121, to line 113. Magnet R47 is adapted to close a pair of contacts R47a which will set up a circuit upon completion of the analysis of the card group as will be explained later. A second pair of contacts R47b will also be opened at this time. Thus an X22 perforation in any of the cards of the group will energize relay magnet R47 which will thereafter remain energized to control the "tax" amount transferring operations during later cycles.

*Arrears transfer cycle setup.*—An exactly similar set of circuits is completed to prepare the machine for transferring the "arrears" amount. In this case, the socket 135 is provided which is plug connected to the lower brush LB which traverses column 80 and an "X" perforation in this column will, through cam contacts F5, cause energization of relay magnet R45 whose contacts R45a provide a holding circuit and whose contacts R45b prepare an "arrears" transfer circuit in the same manner as contacts R47a.

Thus, if the "tax" amount is to be transferred, relay magnet R47 will be energized during the analysis of the card or group of cards and its related contacts will be operated and if the "arrears" amount is to be transferred, the relay magnet R45 will have been similarly energized and its related pairs of contacts also shifted.

Cycles of operation

*Initiation of transferring operations.*—In the following it will be assumed that the machine is to perform successive tax and arrears transferring operations upon the completion of the analysis of a group of cards and the various steps involved in these operations are now to be explained.

It may be explained at this point that a group of cards relating to a particular account are arranged with service cards, such as gas and electricity cards, leading and any cards having data relating to merchandise placed at the end of the group. In order that the merchandise item appear as the last item on the bill (see Fig. 10) the machine is arranged to perform the tax and/or arrears transferring operations before the merchandise card is analyzed. The manner in which such analysis is suspended until transferring has been effected will be explained hereinafter.

Record cards bearing data relating to merchandise have an "X" punching in column 54 and the upper brush traversing this column is connected to a plug socket 136 (Fig. 8a) and on the sensing of this "X" perforation, a circuit will be completed from line 113 (Fig. 8), cam contacts L11, L12, upper brush common, X54 perforation, upper brush UB, plug connection such as 137 (Fig. 8a), socket 136, cam contacts F4, relay magnet R55, wire 138, upper card lever relay contacts UCLb, to line 111.

Relay magnet R55 closes its contacts R55a to provide a holding circuit through cam contacts F10 whose time of closure is the same as contacts F2 and F3 except that the point of opening of contacts F10 is slightly earlier in the cycle. Relay magnet R55 will close a second pair of contacts R55b so that near the end of the cycle, closure of cam contacts L13 will complete a circuit from right side of line 111, cam contacts L13, contacts R55b, contacts R47a, relay magnet R99, wire 121, to line 113. Magnet R99 will close its contacts R99d to provide a holding circuit through cam contacts L17 and P8. A second pair of contacts R99g in the stop circuit of the machine opens to break the above traced holding circuit which extends through stop key contacts 114a and includes relay magnet R39. The consequent deenergization of magnet R39 will cause opening of its contact points R39b in the card feed clutch magnet circuit so that card feed clutch magnet 18 will therefore become deenergized and further card feeding suspended until transferring operations have taken place.

If the group of cards contains no merchandise card with the distinguishing X54 perforation, the same interruption of card feeding and energization of relay magnet R99 will be brought about under control of the group control mechanism GC shown in the lower part of Fig. 8 which in the well known manner will cause deenergization of relay magnets 44 and 43. Magnet 43 will open its contacts R43c in series with the contacts R99g and will cause interruption of card feeding in the same manner. Deenergization of relay magnet R44 will permit closure of its contacts R44a, wired in parallel with the relay contacts R55b so that cam contacts L13 may effect energization of relay magnet R99.

*Tax transfer cycle.*—The machine is now prepared to transfer the tax amount from ACC#4 to ACC#1. This transferring is again controlled through the type bar contacts; that is, the data is read from the accumulator and entered upon the type bars, which, if properly set for duplicate printing, will effect the entry in ACC#1.

Referring now to Fig. 8b the amount standing in ACC#4 will be represented by the location of the various brush structures 66 which bridge the individual segments 67 and common strips 68. The emitter shown in the lower portion of Fig. 8a will have its common strip 88 connected to the right side of line 111 through wire 139 (see also Fig. 8), impulse distributors 133, contacts P2, wire 132, and lower card lever contacts 122.

Impulses will thus be successively impressed upon the segments 87 through the brushes 86 in the order 9, 8, 7, etc., to transmit these impulses to all of the nine segments 67, all of the eight segments 67, and so on in succession. Wherever a segment is connected by a brush 66 to its related strip 68 the circuit will be completed as follows: Assuming that the brush 66 in the highest denominational order of the ACC#4 is set (as indicated in dotted outline) to bridge the "5" segment 67 and its strip 68, at the "5" time in the cycle, therefore, a circuit will be completed from line 111, to common 88 of the emitter brushes 86, "5" segment 87, to all of the "5" segments 67, brush 66 in the highest order of ACC#4, strip 68, contacts 99b, now closed due to the energization of magnet R99, wire 107, contacts 100a, wire 101, to one of the print magnets 37, and through plug connections 108 to other print magnets 37.

Printing will take place in the same manner as explained above in connection with the direct entries from the card and as the type bars are selected for printing, the associated contacts 52 will be closed and now again, if the setting of the type bars is identical in the three positions in which the tax is printed, the same entering circuit for ACC#1 will be completed and the tax data will accordingly be added therein. In this manner, the amount standing in ACC#4 will be transferred to the type bars, their setting checked, and the amount thence entered into ACC#1. As before, if there is any disagreement in the type bar setting, the signal lamp 129 will be illuminated to call the discrepancy to the attention of the operator. The previous energization of magnet R99 has closed a pair of contacts R99e (Fig. 8) completing a circuit from line 111, cam contacts L16, contacts R99e, relay magnet R52, wire 121, to line 113. Contacts R52b provide a holding circuit which runs through cam contacts P8 so that the magnet R52 will remain energized until total printing operations have been performed. A second pair of contacts R52a will be opened upon energization of magnet R52 thereby interrupting the holding circuit through the tax pickup relay magnets R46 and R47 which in turn will now permit opening of contacts R47a and closure of contacts R47b so that relay magnet R99 can now be deenergized when cam contacts L17 open.

*Arrears tax cycle.*—Near the end of the tax transfer cycle, cam contacts L13 will again close, this time completing a circuit from line 111, contacts L13, contacts R55b or R44a as the case may be, contacts R47b, contacts R45b, closed as explained above, relay magnet R100, wire 121, to line 113.

Magnet R100 will close its contacts R100d to provide a holding circuit for itself through cam contacts L17 and P8 and a pair of contacts R100e will close to energize relay magnet R51 when cam contacts L16 close later.

In Fig. 8b, relay magnet R100 will close its contacts R100b so that transferring during this cycle may take place from ACC#5 to the type bars 37. Such transferring circuit is traceable from the read-out strip 68 of ACC#5, through contacts R100b, wire 101, to the print magnets 37 and again as in the case of the tax amount, if the type bars are all positioned alike, the entry will be made into ACC#1 and lamp 129 illuminated if there is any discrepancy.

After this transferring of the arrears amount has been effected, cam contacts L17 open so that magnet R100 will be deenergized and its various contacts will return to the positions shown in the circuit.

*Entering the merchandise amount.*—If the group of cards contains a merchandise card following the service cards, the machine will enter upon one or more card feeding cycles during which the merchanidse amount will be printed and entered into ACC#I. Resumption of card feeding is brought about as follows:

When both relay magnets R99 and R100 are deenergized their related contacts R99g and R100g will be closed and the circuit through relay magnet R39 re-established so that in turn contacts R39b will be closed to energize the card feed clutch magnet 18 and the merchandise card will proceed past the lower brushes which will complete the printing and entering circuits in the same manner as explained in connection with the entry of data from the gross and net bill fields. It is in these same fields that the merchandise amount is perforated.

Total printing and reset cycle

The circuit through relay magnet R39 includes the minor control relay magnet contacts R43c and R43d which upon detection of a group number change by the automatic group control mechanism GC will interrupt further card feeding and automatically initiate total taking and resetting operations. Opening of contacts R43c will interrupt card feeding in the now familiar manner and closure of contacts R43d will complete a circuit from line 111, wire 112, contacts P9, R99g, R100g, R43d, cam contacts L19, relay magnets R40 and R49 to line 113. The contacts R40a of relay magnet R40 are in the reset magnet circuit and upon closure will cause energization of this magnet through a circuit extending from line 113, reset magnet 81, contacts R40a, cam contacts L2, wire 112, to line 111. Through the mechanism controlled by magnet 81, the shaft carrying the cams for controlling the P contacts will function. The first operation to take place will be printing of the total standing in ACC#I. This is brought about as follows: A pair of contacts R40b in the upper part of Fig. 8a will close to complete a circuit extending from line 113 (Fig. 8) contacts R43b, wire 140 (Fig. 8a), contacts R40b, relay magnet R98, cam contacts L18, wire 141 (Fig. 8), cam contacts L17 and P8, to line 111. Energization of magnet R98 will close its contacts R98b in the lower part of Fig. 8a and open its contacts R98a so that the emitter brushes 86 will establish circuits from the read-out strips 68 of ACC#I, through contacts R98b, wire 106, contacts R99a and R100a, now closed, wire 101, to the print magnets 37. Once more the checking contacts 52 will determine whether printing is correctly effected in the several portions of the bill.

Relay magnet R102 in parallel with magnet R98 will cause closure of its contacts R102a in the lower part of Fig. 8a and opening of its contacts R102b so that the entering circuits extending from contacts 52 through wires 125 will extend to the adding magnet 58 of ACC#2 instead of to the adding magnets of ACC#I as before.

In this manner, the entry in ACC#I is printed on the bill and through the checking contacts 52 to the route total ACC#2. Later in the reset cycle, the resetting instrumentalities will come into play to zeroize the several accumulators in the manner explained above. In connection with ACC#2, however, the resetting mechanism is ineffective and the amounts in this accumulator will continue to accumulate to obtain a grand total of all the entries transferred from ACC#I.

Automatic resumption of card feeding

Cam contacts L3 (Fig. 8) are provided to energize the start relay magnets R32 and R33 near the end of the resetting cycle of operations to pick up and energize the card feed clutch magnet 18. The circuits involved in the starting of the machine have already been traced in detail and the operations controlled thereby will proceed in the same manner as explained above.

If it is desired to have the machine stop after the completion of the resetting operation, switch 130 (Fig. 8) is initially set in its dotted line position and near the end of the resetting cycle cam contacts P5 close momentarily to complete a circuit through the relay magnets R37 and R38, the former of which provides a holding circuit through contacts R37a and cam contacts L4.

The relay magnet R38 opens its contacts R38a in the upper part of Fig. 8 to prevent the reestablishment of the starting circuit and the machine will consequently come to rest at the completion of the resetting cycle of operations and resumption of operations may then proceed through initiation of the start key to close contacts 119. As explained above, the failure of the type bars to record identical information in the several portions of the bill will effect energization of relay magnets R35 and R36 and will illuminate lamp 129 and with switch 130 in its full line position during the total taking operation closure of cam contacts P5 will complete a circuit from line 113, through relay magnets R38, R37, contacts P5, switch 130, contacts R35a, R33b, wire 112, to line 111. As just stated energization of relay magnets R37 and R38 will cause the machine to stop at the completion of resetting and the continued illumination of lamp 129 will indicate to the operator that the stopping of the machine has been occasioned by a discrepancy in printing in one or more lines of the bill.

Major total stop

The machine is arranged to automatically stop upon a major group change; that is, when all record cards having the same group number in columns 9 to 12 have passed through the machine. In such event, the group control mechanism GC will cause deenergization of the major control relay magnet R42 permitting closure of its contacts R42a which will establish a circuit from line 113, contacts R42a, wire 145, in parallel through lamp 146 and relay magnet R41, cam contacts L19, contacts R43d, R100g, R99g, cam contacts P9, wire 112, to line 111.

Relay magnet R41 opens its contacts R41a in the starting circuit, preventing the completion of the same. The machine will come to rest with lamp 146 illuminated. It will thus be apparent that the machine will automatically come to a stop under two conditions. First, when there has been a discrepancy in printing, and second, when there has been a major group change. In order to indicate under which of these conditions the machine has come to rest, the lamps 129 and 146 are provided, for former indicating by its illumination that the stopping is due to a printing discrepancy, and the latter, that the cards relating to a particular route have all been analyzed.

Single transfer cycle

Where one of the cards of the group contains an X22 perforation but none contains an X80 perforation, only the tax transfer relay circuits controlled by relay magnet R47 will be energized so that upon the operation of the group control mechanism or the analysis of the merchandise card, the machine will proceed through the tax printing and transferring cycle of operations as described above. At the completion of this transfer cycle, since the arrears pick-up magnet R45 was not energized during the analysis of the group, its contacts R45b will be opened, the arrears transfer magnet R100 will not be energized, and consequently both contacts R100g and R99g will be closed at the end of the tax transfer cycle so that the total taking and resetting cycle or merchandise feed cycle will be initiated at this time as explained.

If a card of the group contained an X80 perforation but no X22 perforation, then only the arrears pick-up relay magnet R45 would be energized and not the tax pick-up relay magnet R47, so that upon the initiation of transferring operations, magnet R100 will be energized instead of magnet R99 due to the fact that contacts R47 will open and contacts R47b and R45b close.

At the completion of the transfer cycle, during which the arrears amount or total in ACC#5 is transferred to ACC#1, magnet R100 will be deenergized and again contacts R100g and R99g are closed at the end of the cycle so that total taking and resetting cycles or merchandise feed cycle will immediately follow.

Where none of the cards of the group contain either the X22 or X80 perforation, indicating that no transferring operations are to take place for that group, contacts R100g and R99g will both be closed at the end of the last card feeding cycle so that closure of contacts L19 near the end of that cycle will initiate the total taking and resetting operations without intervening transferring cycles.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a machine of the class described, means for analyzing a column of a record card for an item entry therein, a plurality of type bars concurrently controlled by said analyzing means to print the analyzed item in duplicate, an accumulator and means jointly controlled by all said bars when all are controlled to print the same item for effecting entry of said item into said accumulator.

2. A tabulating machine having record analyzing means, printing mechanism comprising a plurality of differentially positionable type carriers, means under control of the analyzing means to select the same type character in each carrier in accordance with record analysis, entry receiving mechanism having a differential device for operating the same at differential times, contacts associated with each of said carriers and adapted to be operated thereby upon positioning of the carriers to select a character for printing and means jointly controlled by said contacts when a common character is selected on each carrier for controlling the differential device to effect an entry in accordance with said common character into the entry receiving device.

3. A tabulating machine having record analyzing means, printing mechanism comprising differentially positionable type carriers, means under control of the analyzing means to select a type character in each carrier for duplicate printing in accordance with record analysis, entry receiving mechanism having a differential device for operating the same at differential times, a circuit including means under the joint control of said carriers for completing said circuit when each carrier is positioned to select the same character for printing and means controlled by said circuit for controlling the differential device to effect an entry in accordance with said character into the entry receiving mechanism.

4. In a tabulating machine, means for analyzing a column of a record card for an item entry therein, a plurality of type bars concurrently controlled by said analyzing means to print the analyzed item in duplicate, an accumulator, means jointly controlled by said bars for effecting entry of the item into said accumulator only when the bars are positioned to print the same item, and further means jointly controlled by said bars for indicating a dissimilar positioning of said bars and the consequent failure to enter an item into the accumulator.

5. In a machine of the class described, a plurality of entry receiving devices, means for entering an item into one of said devices, means for reading out the entered item, a plurality of type bars positioned under control of said read-out means to effect duplicate printing of said item, and means controlled by and in accordance with the positioning of said bars for effecting transfer of the item into another of said devices.

6. In a tabulating machine, means for printing in duplicate items derived from each of a group of record cards, means controlled by said printing means for determining the conformity of the items printed, and error indicating means controlled by said determining means for indicating non-conformity of duplicate printed items with one another.

7. In a machine of the class described, means for sensing a column of a record card for an item entry therein, a plurality of type bars, means controlled by said analyzing means for concurrently controlling the positioning of said bars, each in accordance with the item entry sensed, an accumulator, and means jointly controlled by all said bars when all are positioned to print the same character for effecting entry of said item into said accumulator.

8. A tabulating machine having record analyzing means, printing mechanism comprising a plurality of differentially positionable type carriers, means under control of the analyzing means to select the same type character in each carrier in accordance with record analysis, entry receiving mechanism having a differential device for operating the same at differential times, a member associated with each of said carriers and adapted to be operated thereby upon positioning of the carriers to select a character for printing, and means jointly controlled by said members when a common character is selected on each carrier for controlling the differential device to effect an entry in accordance with said common character into the entry receiving device.

9. In a tabulating machine, means for analyzing a column of a record card for an item entry therein, a plurality of type bars concurrently controlled by said analyzing means to print the analyzed item in duplicate, an accumulator, means jointly controlled by said bars for effecting entry of the item into said accumulator only when the bars are positioned to print the same item, a signal lamp, and further means controlled by said bars for causing the illumination of said lamp upon a dissimilar positioning of said bars and the consequent failure to enter an item into the accumulator.

10. A tabulating machine having an entry receiving mechanism, means for entering an amount therein, readout mechanism positioned by said entry receiving mechanism, printing mechanism comprising a plurality of differentially positionable type carriers, devices under control of said readout mechanism to select the same type character in each carrier in accordance with the amount in said entry receiving mechanism, a second entry receiving mechanism having a differential device for operating the same at differential times, contacts associated with each of said carriers and adapted to be operated thereby upon positioning of the carriers to select a character for printing, and means jointly controlled by said contacts when a common character is selected on each carrier for controlling the differential device to effect an entry in accordance with said common character into the second entry receiving mechanism.

11. A tabulating machine having an accumulator, means for entering an amount therein, readout mechanism positioned by said accumulator, printing mechanism comprising a plurality of differentially positionable type carriers, devices under control of said readout mechanism to select the same type character in each carrier in accordance with the entry in said accumulator, an accumulator and entering means therefor, a member associated with each of said carriers and adapted to be operated thereby upon positioning of the carriers to select a character for printing, and means jointly controlled by said members when a common character is selected on each carrier for controlling the last named accumulator entering means to effect an entry in accordance with said common character into the accumulator.

12. In a tabulating machine, an accumulator, entering means therefor, a readout device associated therewith, a second accumulator, means for transferring an amount from said first-named accumulator to said second accumulator, including a plurality of type bars concurrently controlled by said readout mechanism to print the amount in the first accumulator in duplicate, and means jointly controlled by said bars for effecting entry of the amount into said second accumulator only when the bars are positioned to print the same amount.

WILLIAM W. McDOWELL.
GORDEN S. WELLS.